INVENTOR.
RALPH W. SNYDER
BY
Lawrence S. Epstein
ATTORNEY

# United States Patent Office 3,261,970
Patented July 19, 1966

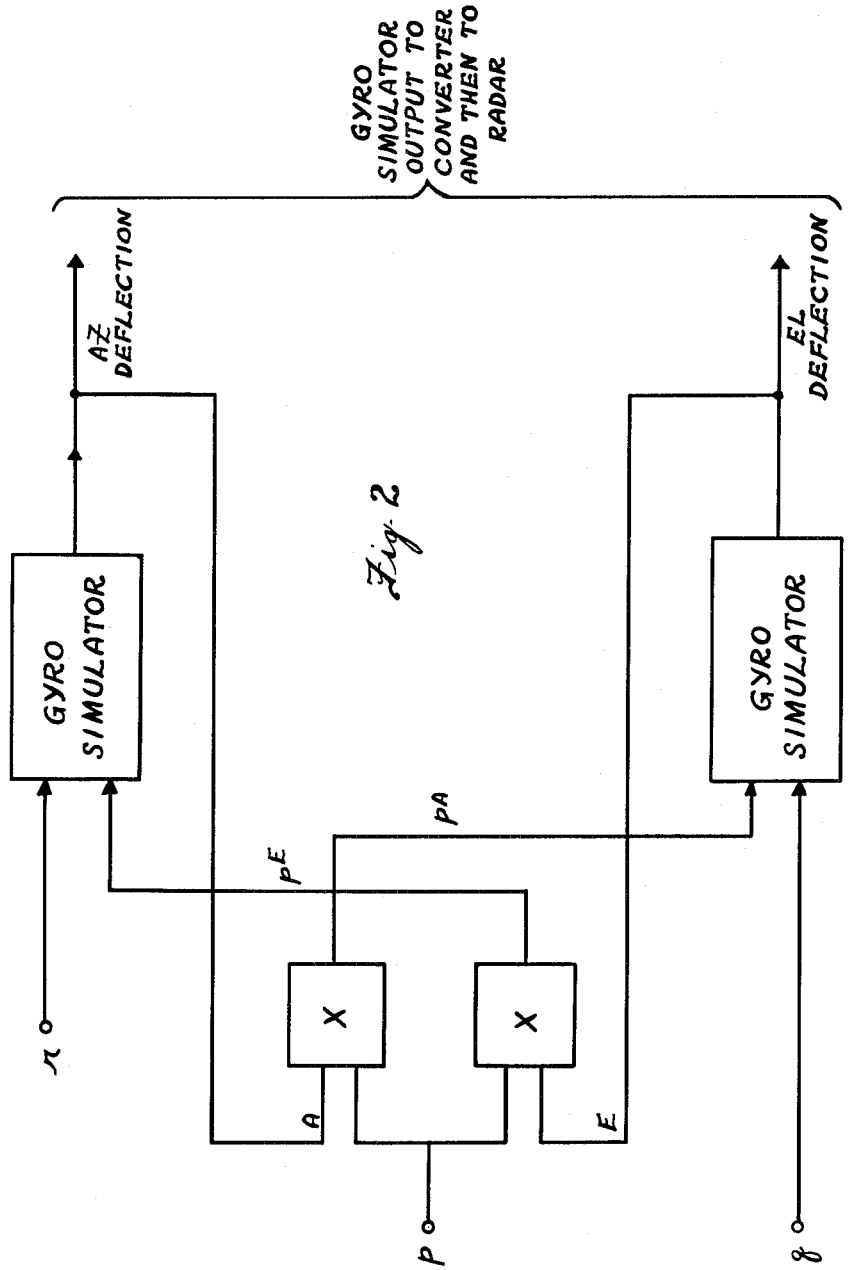

3,261,970
COMPUTING GYRO SIMULATOR
Ralph W. Snyder, Cuyahoga Falls, Ohio, assignor, by mesne assignments, to the United States of America as represented by the Secretary of the Navy
Filed July 10, 1962, Ser. No. 208,970
3 Claims. (Cl. 235—184)

The present invention relates to gyroscopes and more particularly to the simulation of gyroscopes.

An automatic fire control system computes the proper lead angle to score hits on a target that is moving relative to an armed aircraft. The fire control system that is to be simulated establishes this lead angle by the use of two computers, a radar set and a two degree-of-freedom rate gyroscope. The rate gyroscope could be called the heart of the fire control system. Further explanation of the fire control problem will be necessary to understand the function of the gyroscope.

The lead angle that is established by the fire control system is a lead angle in both azimuth and elevation and is dependent upon many factors. The most important single factor is the relative angular velocity between the fighter and the target. This factor establishes the kinematic lead angle. Other factors which may influence the total lead angle required are gravity forces on the projectile, the aircraft velocity, air density, angles of attack and skid, and aircraft bank angle.

Since the kinematic lead angle required is proportional to the turn rate the fighter must maintain to track a target, a device that is sensitive to rates of turn of the aircraft as it follows the target is used in the fire control system. The fire control gyroscope, as it is called, is the unit in the fire control system that responds to angular rates. If it is given the proper input information, its outputs will establish the proper kinematic lead angle which, modified by other factors in the fire control problem, gives the proper total lead angle. The proper information is supplied to the gyro from two input computers. These computers are supplied with necessary information from the radar set and other components.

The gyroscope is an eddy current gyroscope mounted so that the gyroscope has two degrees of freedom; however, it is placed in a magnetic field which tends to constrain the spin axis along the axis of the magnetic field. If the axis of the magnetic field is rotated around either of the two degrees of freedom of the gyroscopic suspension, the force of the magnetic field will overcome the natural tendency of the gyroscope to stay fixed in space, and the gyroscope spin axis will be kept coincident with the axis of the field. When the gyroscope is deflected from the axis of the magnetic field there are two forces acting on the gyroscope; the gyroscopic force which tends to make the gyroscope stay in the same position in space, and the force of the magnetic field. The force of the magnetic field is the larger of those two and will eventually prevail but there is a time delay as it overcomes the gyroscopic force. Thus, for a constant rate of pitching or yawing of the aircraft, the magnetic field is constantly trying to maintain the gyro axis coincident with its own, but because of this delay there will be constant deflection of the gyroscope axis from the axis of the magnetic field.

Previously, the function of this gyroscope in simulator was performed by mounting an operational gyro on a flight table which could be rolled, pitched and yawed in accordance with the roll, pitch and yaw computed in the operational flight trainer. Upon examining the problems of constructing this table it was decided that such a table would be difficult to build and maintain if it were to possess, with reasonable accuracy, the response characteristics of the aircraft. It would require leveling adjustments after each move of the trainer, high torque—high speed components, and more space than a servo system simulating the gyro. Therefore, it was decided to undertake the simulation of the eddy current gyroscope.

It is an object of the present invention to simulate the operation of a gyroscope.

A further object of the present invention is to produce a gyroscopic simulator which is less expensive than previous gyroscopic simulators.

Another object of the present invention is to produce a gyroscopic simulator which simulates the characteristics of the gyro as limited by the mechanical limits of the gyroscope.

Other objects and many of the attendant advantages of this invention will be readily appreciated as the same becomes better understood by reference to the following detailed description when considered in connection with the accompanying drawings wherein:

FIG. 2 is a simplified block diagram of a portion of the present invention; and

Figure 3A:
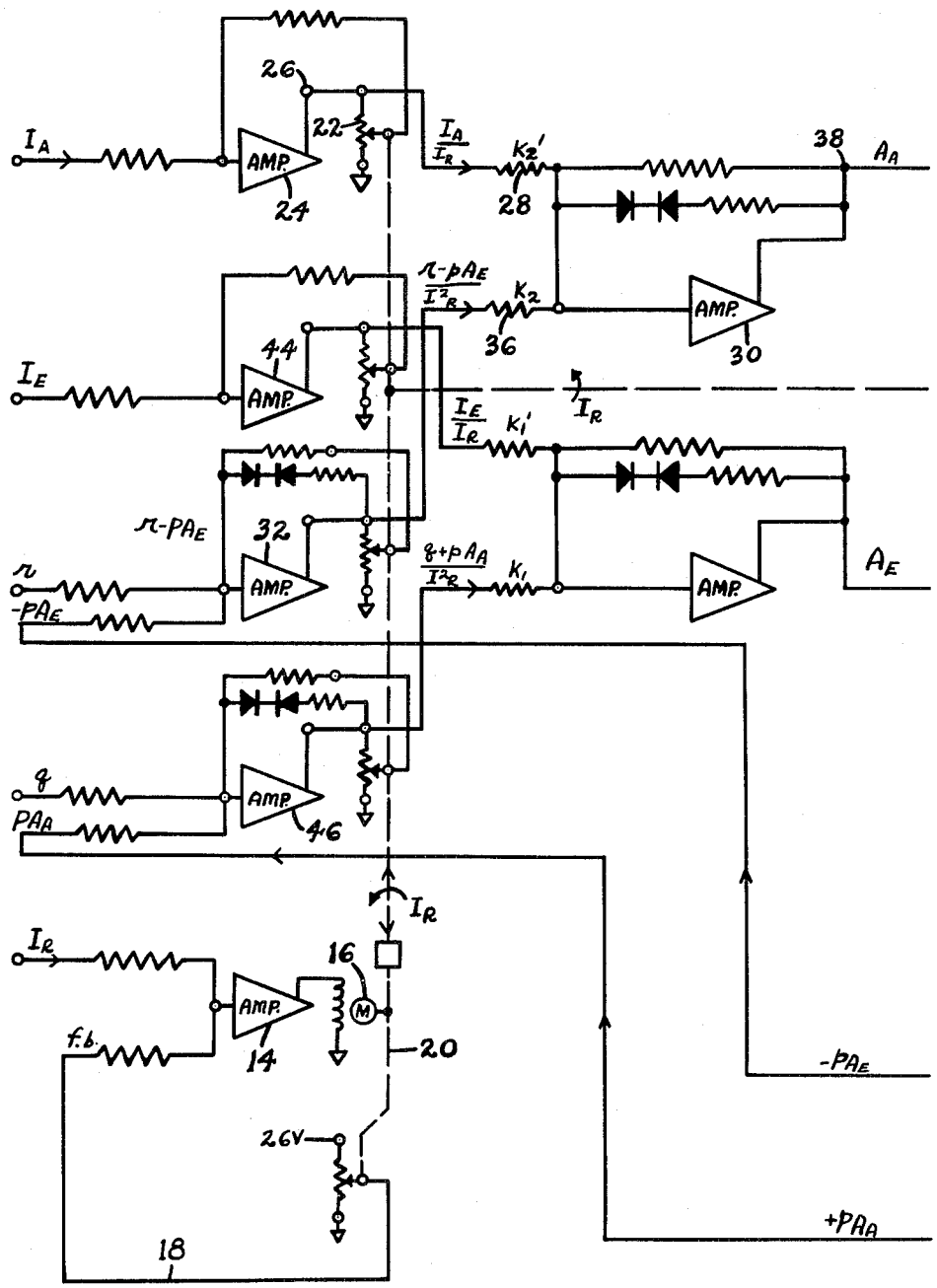
Figure 3B:
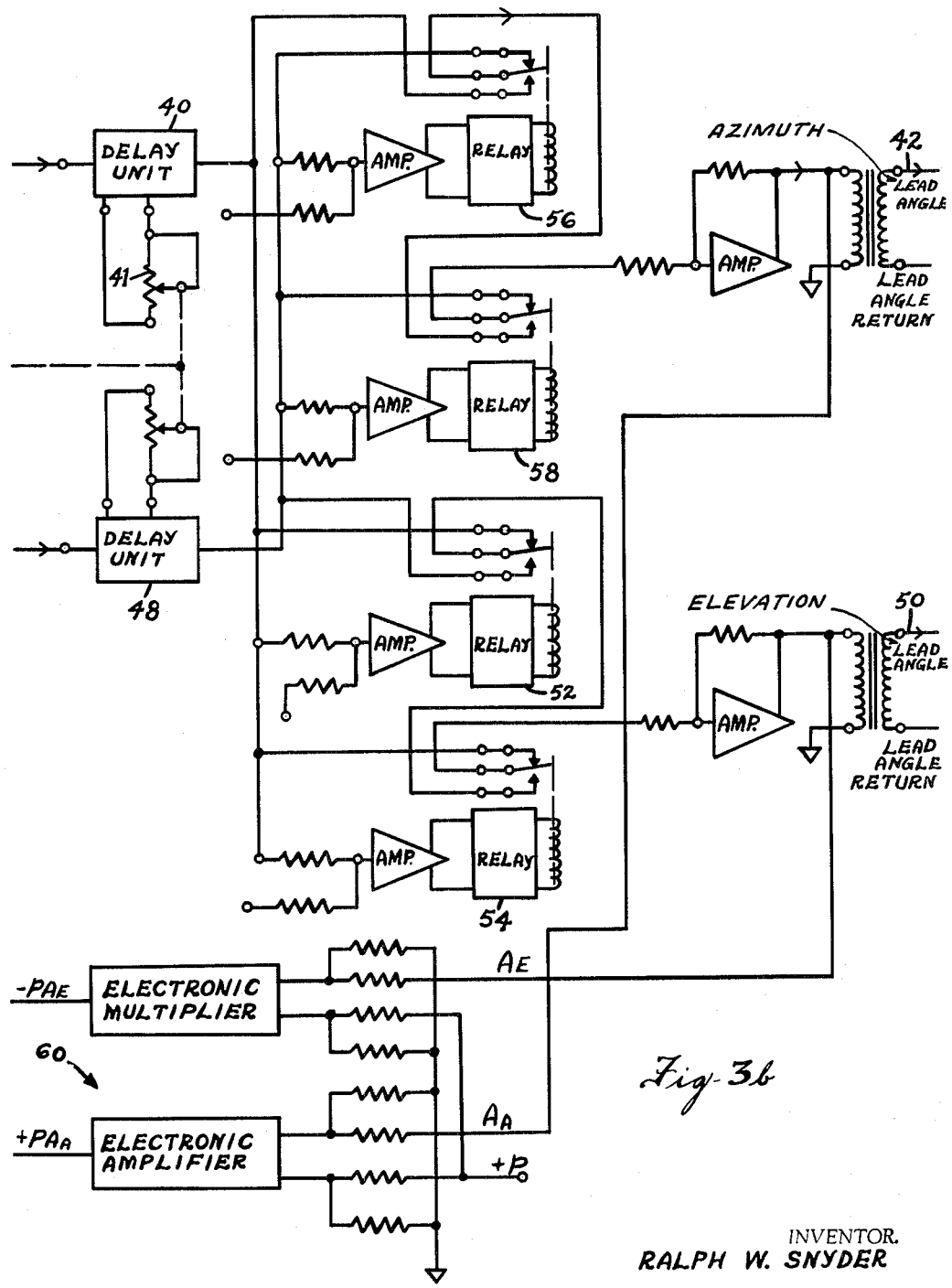

FIG. 3 including 3a and 3b, is a schematic of an embodiment of the invention.

Figure 1:
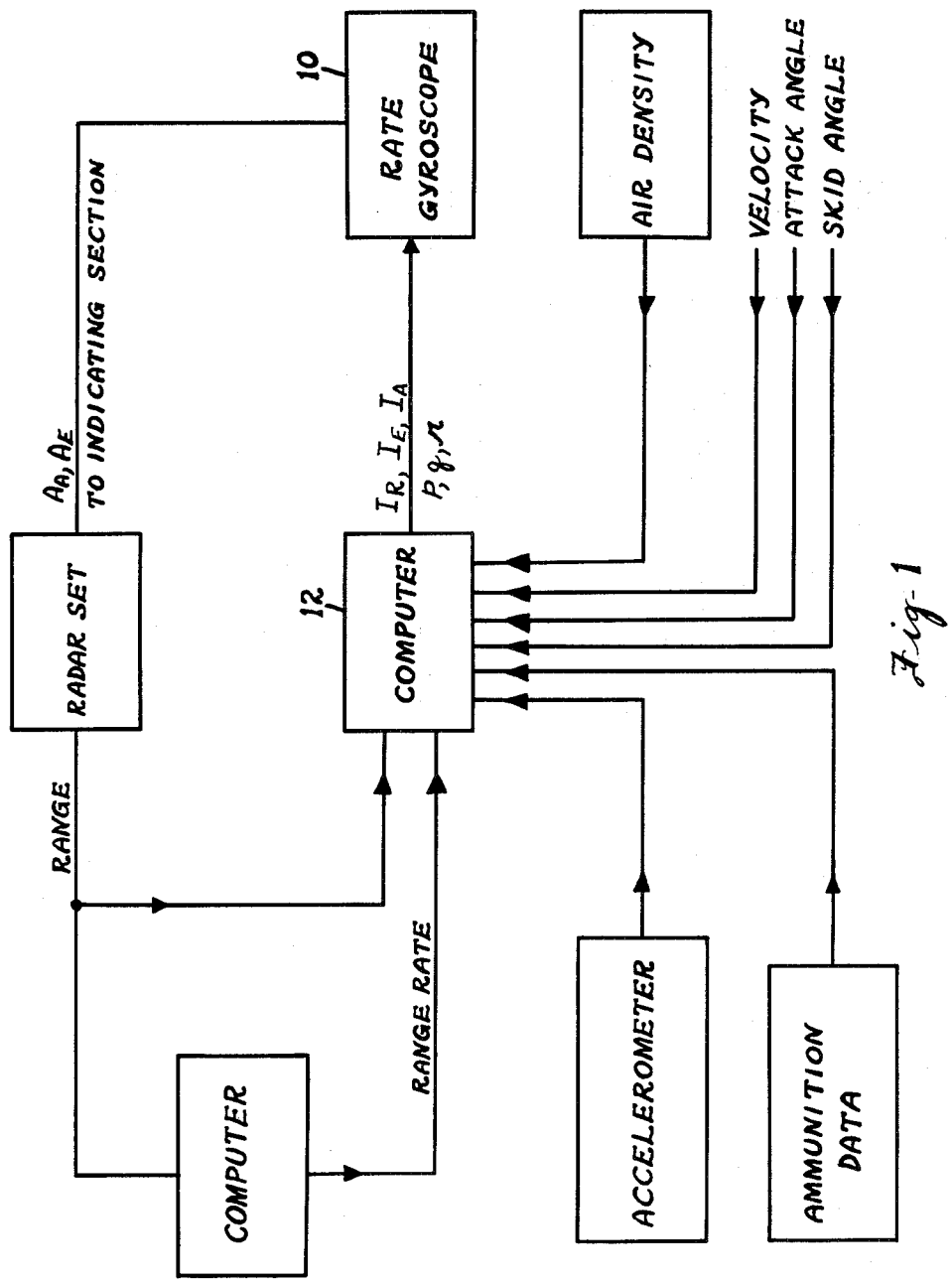
FIG. 1 is a block diagram of a fire control system which may be simulated by the use of the present invention.

Referring to FIG. 1, it may be seen that the rate gyroscope 10 of the invention receives from the computer 12 range coil current $I_R$, azimuth coil current $I_A$, elevation coil current $I_E$, aircraft angular velocity about the Z axis, $r$ and the aircraft angular velocity about the X axis, $p$. For small deflections of the gyro spin axis, the relationship of the gyro's outputs $A_A$ and $A_E$ to these inputs may be represented as follows:

$$A_A = \frac{K_2' I_A}{I_R} + \frac{K_2(r - pA_E)}{I_R^2}$$

and $$A_E = \frac{K_1' I_E}{I_R} + \frac{K_2(q + pA_A)}{I_R^2}$$

where $A_A$ = Azimuth deflection of the gyro spin axis
$A_E$ = Elevation deflection of the gyro spin axis
$I_A$ = Net azimuth offset coil current
$I_E$ = Net elevation offset coil current
$I_R$ = Range coil current
$r$ = Aircraft angular velocity about the z (yaw) axis
$p$ = Aircraft angular velocity about the x (roll) axis
$q$ = Aircraft angular velocity about the y (pitch) axis A simulation of the gyro consists of solving this pair of simultaneous equations, introducing the appropriate time delays to simulate the effect of the inertia of the operational gyro and also providing for the simulation of the action which occurs when the gyro strikes its mechanical stops. Referring to FIG. 3, $I_R$ is fed to an amplifier 14 which drives a servo 16. Because of a feedback loop 18 which produces a signal proportional to the position of the motor's shaft 20, the shaft's position is proportional to the input range current $I_R$.

Mounted on this shaft 20 are a number of function potentiometers. These potentiometers determine the feedback gain of a number of amplifiers. The first of these potentiometers herein referred to as the azimuth offset potentiometer 22 is a linear potentiometer and controls the feedback gain around the azimuth amplifier 24, into which the azimuth current $I_A$ is fed. This potentiometer 22 is coupled across the output of the amplifier 24. Thus the gain of the azimuth amplifier 22 is determined by the potentiometer's position, and since the amount of feedback is proportional to $I_R$, the output 26 of the amplifier 24 will be $I_A/I_R$, the offset angle. This output is passed through a summing resistor 28 into an azimuth summing amplifier 30 where it is summed with an electrical signal proportional to the kinematic lead angle, $K_2(r-pA_E)/I_R^2$, to give as the output of the amplifier 30 the total lead angle $A_A$. The second term $K_2(r-pA_E)/I_R^2$ is computed in an azimuth kinematic lead amplifier 32. The input to this amplifier is $r-pA_E$. The aircraft's velocities about the X and Y axes, $p$ and $r$, respectively, come from the computer 10. How the term $-pA_E$ is computed will be explained fully later in the specification. The feedback around this amplifier 32, like the azimuth offset amplifier 24, is a function of $I_R$; however, in this case the feedback potentiometer is a square law potentiometer, so the gain of the kinematic amplifier 34 is a function of $I_R^2$. Since the input of the amplifier is $r-pA_E$, the output is $r-pA_E/I_R^2$. As stated before, this is fed through a summing resistor 36, into the summing amplifier 30. The relationship of the summing resistors 28 and 36 is such that the gain constants $K_2'$ and $K_2$ are realized.

The output of the summing amplifier 30 is fed to a delay unit 40. This delay unit is to simulate the actual response of the gyro. The delay of a gyroscope is dependent upon the range current $I_R$. Thus the delay unit has a potentiometer 41 which varies the delay as a function of the range servo's shaft 20 position. $A_E$, the elevation deflection, is produced in the same manner; $I_E$, the elevation offset coil current is fed into the elevation offset amplifier 44, while $q$, the angular velocity about the aircraft's Y axis, and $+pA_A$, a term whose development will be explained later, are fed to the elevation kinematic lead amplifier 46. Thus $$A_E = \frac{K_1' I_E}{I_R} + \frac{K_1(q+pA_A)}{I_R^2}$$

appears at the output of the elevation delay circuit 48, and as in the case of $A_A$, it is fed to the $A_E$ output 50.

As long as the computed deflections do not exceed the limits of the gyroscope, the outputs of the azimuth and elevation delay units 40 and 48 are coupled respectively to the azimuth and elevation outputs 42 and 50. However, in the actual gyro, higher angular rates may cause the gyro spin axis to deflect away from its zero position by as much as 18°. When this occurs, a mechanical limit is reached. Upon striking this limit, the gyro very rapidly precesses in a direction at right angles to the original deflection. To simulate this action in the computing gyro simulator, a discriminator circuit consisting of four magnitude sensitive relays—a $+A_A$ sensitive relay 52, a $-A_A$ sensitive relay 54, a $+A_E$ sensitive relay 56 and a $-A_E$ sensitive relay 58—switches the $A_E$ signal into the $A_A$ channel and the $A_A$ signal into the $A_E$ channel when they exceed their limits. To produce the cross coupling terms $-pA_E$ and $pA_A$ the outputs $A_A$ and $A_E$ are multiplied by the roll velocity $p$ in a two channel electronic multiplier 60. The outputs of the multiplier 60, $-pA_E$ and $pA_A$, are then combined with $r$ and $q$ respectively and are fed into the azimuth 32 and elevation 46 amplifiers, as previously described.

Caging of the actual gyro is accomplished by increasing the range coil current $I_R$ to a very large value, which limits the deflection of the gyro spin axis to a very small value. In the simulator, a large value of $I_R$, obtained from the computer 12, restricts the outputs $A_A$ and $A_E$ to small values.

Obviously many modifications and variations of the present invention are possible in the light of the above teachings. It is therefore to be understood that within the scope of the appended claims the invention may be practiced otherwise than as specifically described.

What is claimed is:

1. A device for simulating the operation of gyroscopic instrument situated in a moving vehicle, when supplied with simulated signal information representing; range coil current $I_R$, net azimuth offset coil current $I_A$, net elevation offset coil current $I_E$, aircraft angular velocity about the yaw axis $r$, aircraft angular velocity about the roll axis $p$, and aircraft angular velocity about the pitch axis $q$, the magnitudes of these signals being proportional to the information represented, comprising:

servo means, having the range coil current as its input, and having an output shaft whose position is proportional to its input, for providing a shaft output position which is proportional to the range coil current $I_R$;

azimuth amplifier means, having the net azimuth offset coil current signal $I_A$ as its input, coupled to said servo means output shaft, for providing an output signal proportional to $I_A/I_R$;

azimuth kinematic lead angle amplifier means, coupled to said servo means output shaft, and having a first input signal coupled thereto, the aircraft angular velocity about the yaw axis signal $r$, and having a second input signal coupled thereto, $-pA_E$, for providing an output signal proportional to $$\frac{r-pA_E}{I_R^2}$$

first summing means coupled to the output of said azimuth amplifier means and said azimuth kinematic lead angle amplifier means, for summing both said azimuth amplifier means output, in correct proportion, to obtain an output signal $A_A$ proportional to $$\frac{K_2'}{I_R}I_A + \frac{K_2(r-pA_E)}{I_R^2}$$

which is proportional to the azimuth output of the gyroscope;

elevation amplifier means, having the net elevation offset coil current $I_E$ as its input, coupled to said servo means output shaft, for providing an output signal proportional to $I_E/I_R$;

elevation kinematic lead angle amplifier means, which is coupled to said servo means output shaft, and having a first input signal coupled thereto, the aircraft angular velocity about the pitch axis signal $q$, and having a second input signal coupled thereto, $+pA_A$, for providing an output signal proportional to $$\frac{q+pA_A}{I_R^2}$$

second summing means, coupled to the outputs of said elevation amplifier means and said elevation kinematic lead angle amplifier means, for summing both said elevation amplifier means output, in correct proportion, to obtain an output signal $A_E$ proportional to $$\frac{K_1' I_E}{I_R} + \frac{K_1'(q+pA_A)}{I_R^2}$$

which is proportional to the elevation output of the gyroscope;

first multiplying means, having its output coupled to the azimuth's kinematic lead angle amplifier's means second input, and having a first and second input, the first input being coupled to the output of said second summing means, and the second input having the signal representing aircraft angular velocity $p$ about the roll axis as its input for providing the azimuth kinematic lead angle amplifier mean's second input, $-pA_E$; and second multiplying means having its output coupled to the elevation's kinematic lead angle amplifier's means second input, and having a first and second input, the first input being coupled to the output of said first summing means, and the second input having the signal representing aircraft angular velocity $p$ about the roll axis as its input, for providing the elevation kinematic lead angle amplifier mean's second input $+pA_A$.

2. The device as in claim 1, including, variable delay means, coupled to said first and second summing means for delaying $A_A$ and $A_E$ individually to simulate the inherent lag in gyroscopic instruments, said delay means being a function of $I_R$.

3. The device as in claim 2, including, relay means to switch the outputs, $A_A$ and $A_E$ to simulate the effect of the gyroscopic instrument exceeding its mechanical limits.

No references cited.

MALCOLM A. MORRISON, *Primary Examiner.*

K. W. DOBYNS, *Assistant Examiner.*